United States Patent
Lee et al.

(10) Patent No.: US 10,892,859 B2
(45) Date of Patent: Jan. 12, 2021

(54) METHOD FOR PERFORMING HARQ OPERATION IN NOMA BASED SYSTEM AND APPARATUS THEREFOR

(71) Applicant: LG Electronics Inc., Seoul (KR)

(72) Inventors: Hojae Lee, Seoul (KR); Kwangseok Noh, Seoul (KR); Dongkyu Kim, Seoul (KR); Sangrim Lee, Seoul (KR); Myeongjin Kim, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 16/475,776

(22) PCT Filed: Jan. 4, 2017

(86) PCT No.: PCT/KR2017/000104
§ 371 (c)(1),
(2) Date: Jul. 3, 2019

(87) PCT Pub. No.: WO2018/128200
PCT Pub. Date: Jul. 12, 2018

(65) Prior Publication Data
US 2019/0356423 A1    Nov. 21, 2019

(51) Int. Cl.
*H04L 1/18* (2006.01)
*H04L 1/00* (2006.01)
(Continued)

(52) U.S. Cl.
CPC .......... *H04L 1/1819* (2013.01); *H04L 1/0071* (2013.01); *H04L 5/0055* (2013.01); *H04W 72/042* (2013.01); *H04W 72/0446* (2013.01)

(58) Field of Classification Search
CPC ...... H04L 5/0055; H04L 1/1861; H04L 5/001
See application file for complete search history.

(56) References Cited

U.S. PATENT DOCUMENTS 9,118,448 B2 * 8/2015 Yang .................. H04W 72/042
2016/0353424 A1   12/2016 Stirling-Gallacher et al.
2016/0374060 A1   12/2016 Lim et al.

FOREIGN PATENT DOCUMENTS

WO    2016/171494 A1    10/2016

OTHER PUBLICATIONS

LG Electronics: "On MA resource and MA signature configurations", R1-1609227, 3GPP TSG RAN WG1 Meeting #86bis, Lisbon, Portugal, Oct. 10-14, 2016.

(Continued)

*Primary Examiner* — Chandrahas B Patel
(74) *Attorney, Agent, or Firm* — Dentons US LLP

(57) ABSTRACT

A method in which a terminal performs a HARQ operation in a NoMA-based system comprises a step of receiving a downlink control information (dci) format comprising a multiple access (MA) signature field for supporting NoMA transmission; a step of receiving downlink data based on a value of the MA signature indicated by the MA signature field; and a step of transmitting an ACK/NACK signal with respect to the downlink data based on a subframe offset value, a frequency offset value, or a sequence index value, which are tied with the indicated value of the MA signature according to a predefined rule, wherein the subframe offset value comprises the subframe offset value between a reception subframe of the downlink data and a downlink HARQ feedback transmission subframe with respect to the downlink data, and wherein the frequency offset value indicates a frequency band used for transmitting the ACK/NACK signal.

14 Claims, 11 Drawing Sheets

(51) Int. Cl.
*H04L 5/00* (2006.01)
*H04W 72/04* (2009.01)

(56) References Cited

OTHER PUBLICATIONS

LG Electronics: "Discussion on HARQ timing and resource for NR", R1-1611845, 3GPP TSG RAN WG1 Meeting #87, Reno, USA, Nov. 14-18, 2016.

* cited by examiner

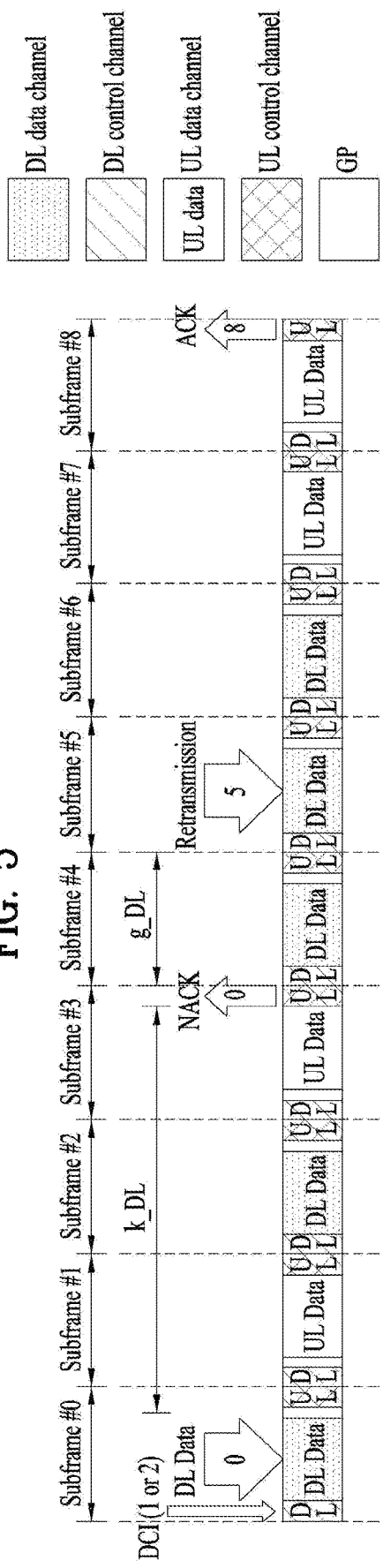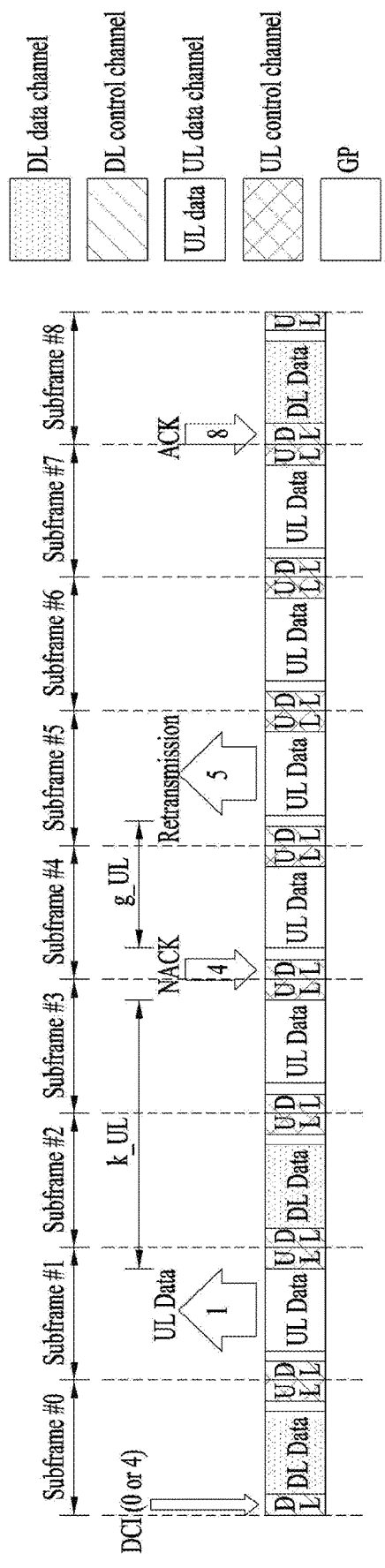

METHOD FOR PERFORMING HARQ OPERATION IN NOMA BASED SYSTEM AND APPARATUS THEREFOR

This application is a National Stage Entry of International Application No. PCT/KR2017/000104 filed Jan. 4, 2017, which is incorporated herein by reference.

TECHNICAL FIELD

The present disclosure relates to a wireless communication system, and more particularly to, a method of performing a hybrid automatic repeat request (HARQ) operation in a non-orthogonal multiple access (NoMA) based system and apparatus therefor.

BACKGROUND

The 3rd generation partnership project long term evolution (3GPP LTE) system was designed to have a frame structure with a transmission time interval (TTI) of 1 ms, and the data delay time required for a video application was 10 ms. However, the next-generation 5G technology requires data transmission with much lower latency due to the appearance of new applications such as real-time control and the tactile Internet. Specifically, it is expected that 5G data delay will decrease to 1 ms.

DISCLOSURE OF THE INVENTION

Technical Task

An object of the present disclosure is to provide a method of performing a HARQ operation by a user equipment (UE) in a NoMA-based system.

Another object of the present disclosure is to provide a UE for performing a HARQ operation in a NoMA-based system.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, provided is a method of performing a hybrid automatic repeat request (HARQ) operation by a user equipment (UE) in a non-orthogonal multiple access (NoMA) based system. The method may include: receiving a downlink control information (DCI) format including a multiple access (MA) signature field for supporting NoMA transmission; receiving downlink data based on a value of an MA signature indicated by the MA signature field; and transmitting an acknowledgement/negative acknowledgement (ACK/NACK) signal for the downlink data based on a subframe offset value, a frequency offset value, or a sequence index value tied to the value of the indicated MA signature according to a predetermined rule. The subframe offset value may include a subframe offset value between a subframe in which the downlink data is received and a subframe in which the downlink HARQ feedback for the downlink data is transmitted, and the frequency offset value may indicate a frequency band for transmitting the ACK/NACK signal.

The MA signature may include a codeword index, a codebook index, an interleaver index, a demodulation reference signal index, a spatial dimension, or a power dimension.

The ACK/NACK signal may be transmitted further based on a number of a control channel element (CCE) on which the MA signature field is transmitted according to the predetermined rule.

The ACK/NACK signal may be transmitted in the subframe indicated by the subframe offset value tied to the value of the indicated MA signature.

The ACK/NACK signal may be transmitted in the frequency band indicated by the frequency offset value tied to the value of the indicated MA signature.

The ACK/NACK signal may be transmitted by applying a sequence corresponding to the sequence index value tied to the value of the indicated MA signature to the ACK/NACK signal. The MA signature field may be a 2-bit field.

In another aspect of the present disclosure, provided is a user equipment (UE) for performing a hybrid automatic repeat request (HARQ) operation in a non-orthogonal multiple access (NoMA) based system. The UE may include: a receiver; a transmitter; and a processor. The processor may be configured to: control the receiver to receive a downlink control information (DCI) format including a multiple access (MA) signature field for supporting NoMA transmission and receive downlink data based on a value of an MA signature indicated by the MA signature field; and perform control to transmit an acknowledgement/negative acknowledgement (ACK/NACK) signal for the downlink data based on a subframe offset value, a frequency offset value, or a sequence index value tied to the value of the indicated MA signature according to a predetermined rule. The subframe offset value may include a subframe offset value between a subframe in which the downlink data is received and a subframe in which the downlink HARQ feedback for the downlink data is transmitted, and the frequency offset value may indicate a frequency band for transmitting the ACK/NACK signal.

The MA signature comprises a codeword index, a codebook index, an interleaves index, a demodulation reference signal index, a spatial dimension, or a power dimension.

The processor may be configured to control the transmitter to transmit the ACK/NACK signal further based on a number of a control channel element (CCE) on which the MA signature field is transmitted according to the predetermined rule.

The processor may be configured to control the transmitter to transmit the ACK/NACK signal in the subframe indicated by the subframe offset value tied to the value of the indicated MA signature.

The processor may be configured to control the transmitter to transmit the ACK/NACK signal in the frequency band indicated by the frequency offset value tied to the value of the indicated MA signature.

The processor may be configured to apply a sequence corresponding to the sequence index value tied to the value of the indicated MA signature to the ACK/NACK signal; and control the transmitter to transmit the ACK/NACK signal to which the sequence is applied. The MA signature field may be a 2-bit field.

Advantageous Effects

A field for MA signature information may need to be included in DCI. In this case, if control information is continuously transmitted, DCI overhead may increase.

However, this problem can be solved by control signaling according to an embodiment of the present disclosure.

The effects that can be achieved through the embodiments of the present disclosure are not limited to what has been particularly described hereinabove and other effects which are not described herein can be derived by those skilled in the art from the following detailed description.

DESCRIPTION OF DRAWINGS

The accompanying drawings, which are included to provide a further understanding of the invention and are incorporated in and constitute a part of this specification, illustrate embodiments of the invention.

FIG. 5 is a diagram illustrating HARQ feedback and retransmission timings when $k_{DL}=3$ and $g_{DL}=2$.

FIG. 6 is a diagram illustrating HARQ feedback and retransmission timings when $k_{UL}=3$ and $g_{UL}=1$.

MODE FOR THE INVENTION

Figure 1:
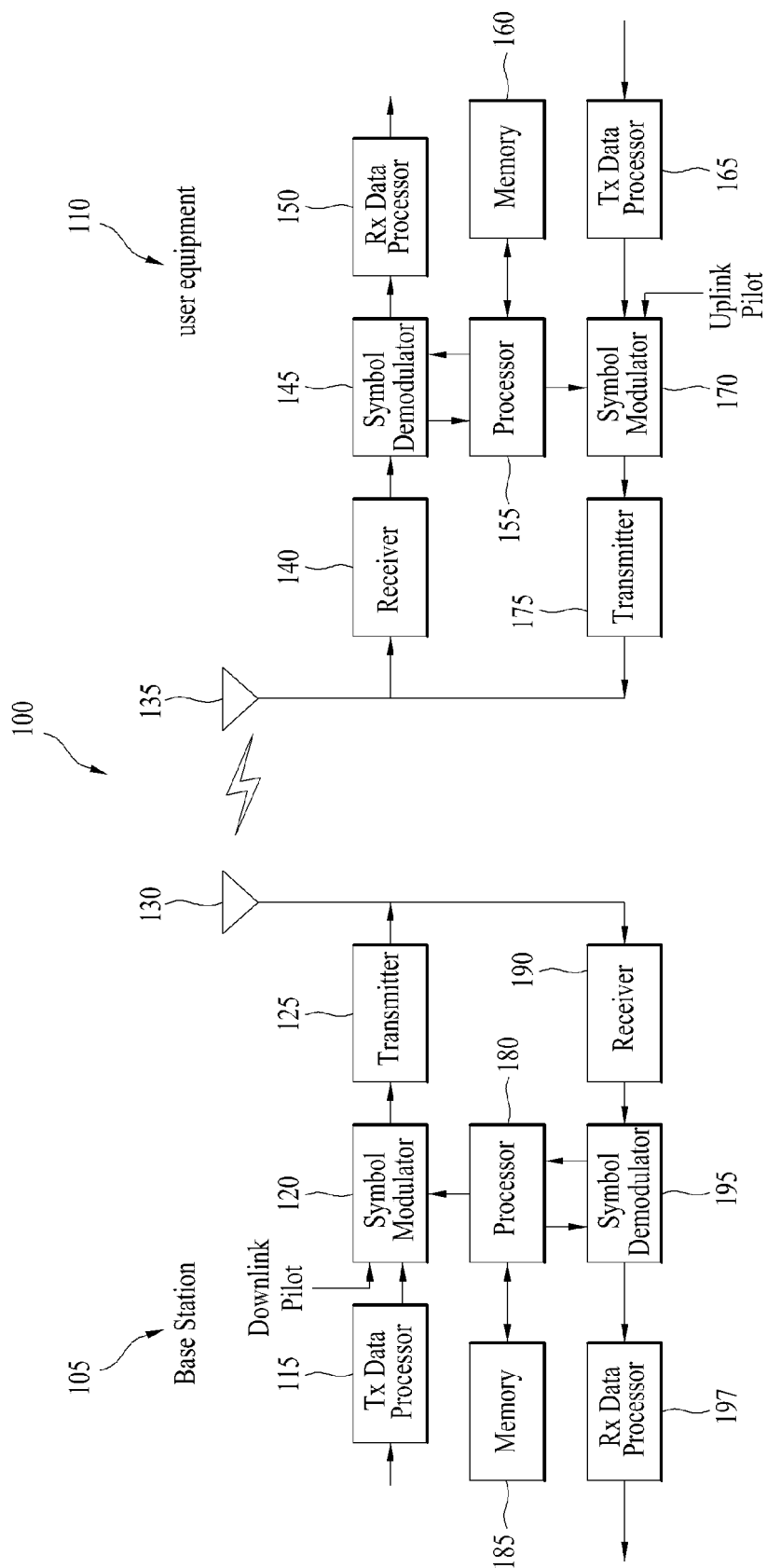
FIG. 1 is a block diagram for configurations of a base station 105 and a user equipment 110 in a wireless communication system 100.

Reference will now be made in detail to the preferred embodiments of the present disclosure, examples of which are illustrated in the accompanying drawings. In the following detailed description of the disclosure includes details to help the full understanding of the present disclosure. Yet, it is apparent to those skilled in the art that the present disclosure can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present disclosure from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on IEEE 802.16m system, contents of the present disclosure may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc. UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE.

Moreover, in the following description, specific terminologies are provided to help the understanding of the present disclosure. And, the use of the specific terminology can be modified into another form within the scope of the technical idea of the present disclosure.

FIG. 1 is a block diagram for configurations of a base station 105 and a user equipment 110 in a wireless communication system 100.

Although one base station 105 and one user equipment 110 (D2D user equipment included) are shown in the drawing to schematically represent a wireless communication system 100, the wireless communication system 100 may include at least one base station and/or at least one user equipment.

Referring to FIG. 1, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a user equipment 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the base station/user equipment 105/110 includes one antenna 130/135 in the drawing, each of the base station 105 and the user equipment 110 includes a plurality of antennas. Therefore, each of the base station 105 and the user equipment 110 of the present disclosure supports an MIMO (multiple input multiple output) system. And, the base station 105 according to the present disclosure may support both SU-MIMO (single user-MIMO) and MU-MIMO (multi user-MIMO) systems.

In downlink, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the user equipment via the antenna 130.

In the configuration of the user equipment 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

In the user equipment 110 in uplink, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the base station 105 via the antenna 135.

In the base station 105, the uplink signal is received from the user equipment 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the user equipment 110.

The processor 155/180 of the user equipment/base station 110/105 directs operations (e.g., control, adjustment, management, etc.) of the user equipment/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present disclosure as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present disclosure using firmware or software, the firmware or software may be configured to include modules, procedures, and/or functions for performing the above-explained functions or operations of the present disclosure. And, the firmware or software configured to implement the present disclosure is loaded in the processor 155/180 or saved in the memory 160/185 to be driven by the processor 155/180.

Layers of a radio protocol between a user equipment/base station and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A user equipment and a base station may be able to exchange RRC messages with each other through a wireless communication network and RRC layers.

In the present specification, although the processor 155/180 of the user equipment/base station performs an operation of processing signals and data except a function for the user equipment/base station 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

In the next-generation 5G system, scenarios may be divided into enhanced mobile broadband (eMBB), ultra-reliable machine-type communications (uMTC), massive machine-type communications (mMTC), etc. The eMBB corresponds to a next-generation mobile communication scenario characterized by high spectrum efficiency, high user experienced data rates, high peak data rates, etc. The uMTC corresponds to a next-generation mobile communication scenario characterized by ultra-high reliability, ultra-low latency, ultra-high availability, etc. (for example, the uMTC may include V2X, emergency services, remote control, etc.).

The mMTC corresponds to a next-generation mobile communication scenario characterized by low cost, low energy, short packets, massive connectivity, etc. (for example, the mMTC may include Internet of Things (IoT)).

Figure 2:
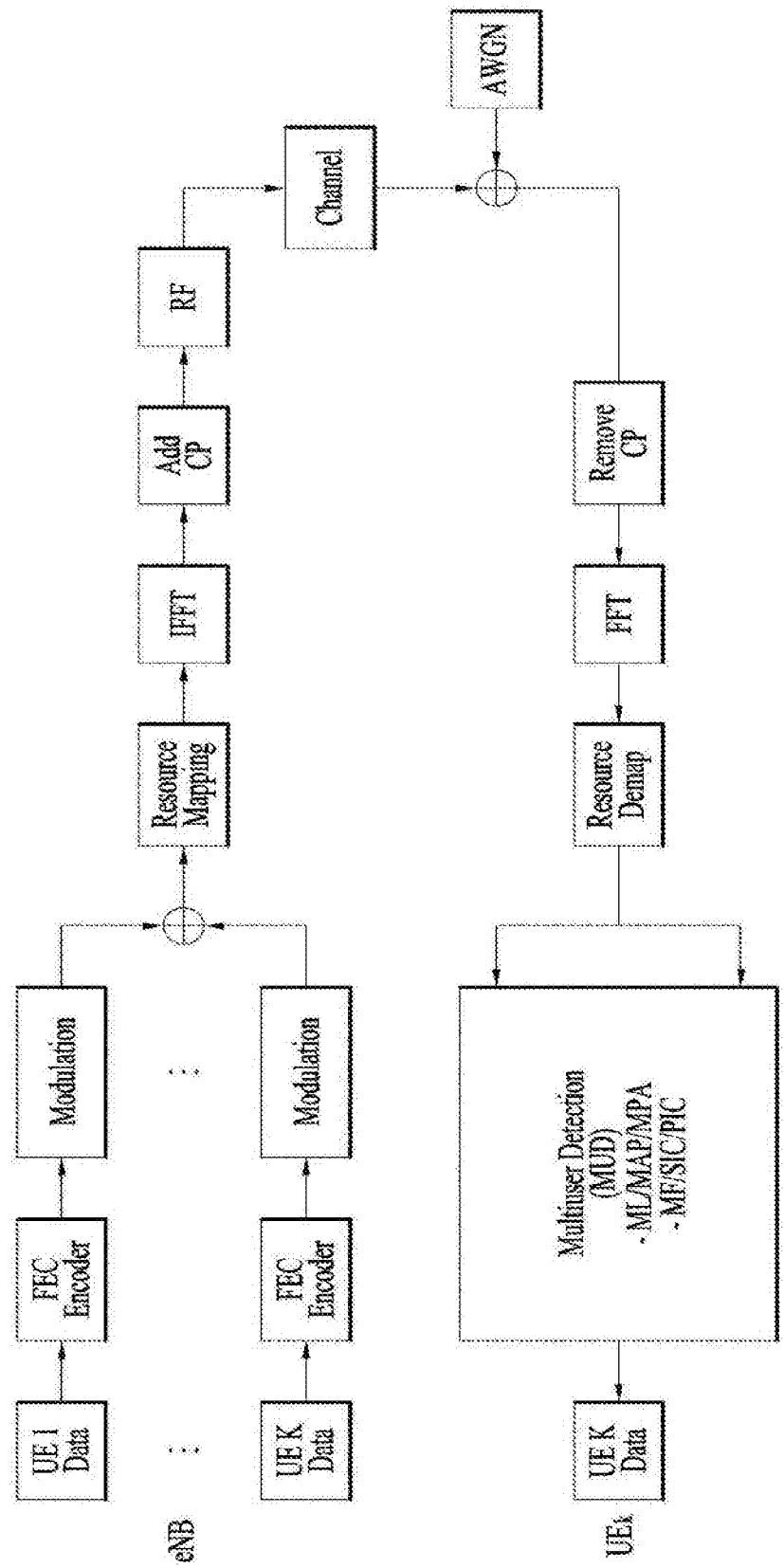
FIG. 2 is a block diagram illustrating NoMA-based downlink transmission/reception (Tx/Rx) between communication devices.

FIG. 2 is a block diagram illustrating NoMA-based downlink transmission/reception (Tx/Rx) between communication devices.

The Tx/Rx structure for downlink support shown in FIG. 2 is generally used in a NOMA system where multi-UE (or multiuser) information is allocated to the same resource and transmitted thereon. In the 3GPP standardization, the NoMA system is referred to as 'multiuser superposition transmission (MUST) system'. Since information for multiple UEs is superposed and transmitted on the same time-frequency resource in the NOMA system, it can guarantee high transmission capacity and increase the number of simultaneous accesses compared to the legacy LTE system. Thus, the NoMA system is considered as a core technology for the next-generation 5G system. For example, the NOMA-based technology for the next-generation 5G system may include: MUST where UEs are identified based on their power levels; sparse code multiple access (SCMA) where modulation is performed based on a sparse complex codebook; and interleave division multiple access (IDMA) where a UE-specific interleaver is used.

Referring to FIG. 2, in the MUST system, a transmitting end modulates data for multiple UEs and then allocates different power to each symbol. Alternatively, the transmitting end hierarchically modulates the data for multiple UEs based on hierarchical modulation and then transmits the hierarchically modulated data. A receiving end demodulates the data for multiple UEs (hereinafter such data is referred to as multi-UE data) based on multiuser detection (MUD).

In the SCMA system, the transmitting end transmits multi-UE data by replacing a forward error correction (FEC) encoder and a modulation procedure for the multi-UE data with a predetermined sparse complex codebook modulation scheme. The receiving end demodulates the multi-UE data based on the MUD.

In the IDMA system, the transmitting end modulates and transmits FEC encoding information for multi-UE data using UE-specific interleavers, and the receiving end demodulates the multi-UE data based on the MUD.

Each of the systems may demodulate multi-UE data using various MUD schemes. For example, the MUD schemes may include maximum likelihood (ML), maximum joint a posteriori probability (MAP), message passing algorithm (MPA), matched filtering (MF), successive interference cancellation (SIC), parallel interference cancellation (PIC), codeword interference cancellation (CWIC), etc. In this case, the demodulation complexity and processing time delay may vary depending on modulation schemes or the number of demodulation attempts.

Figure 3:
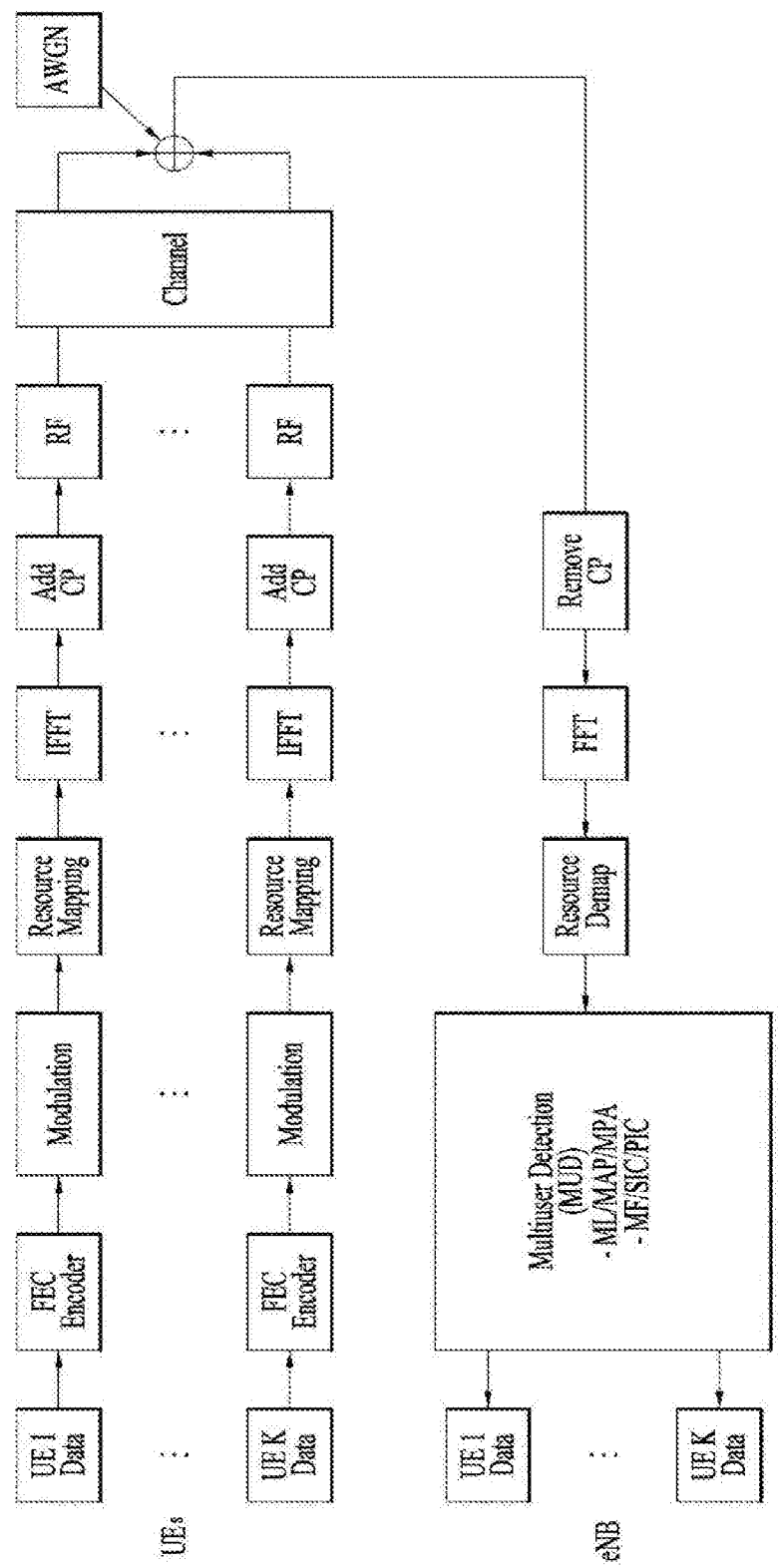
FIG. 3 is a block diagram illustrating NoMA-based uplink Tx/Rx between communication devices.

FIG. 3 is a block diagram illustrating NoMA-based uplink Tx/Rx between communication devices.

Specifically, FIG. 3 shows the Tx/Rx structure for uplink support in a NoMA-based system where information for multiple UEs (hereinafter such information is referred to as multi-UE information) is allocated to the same resource and transmitted thereon. In each of the systems, a transmitting end may transmit multi-UE data in the same manner as described in FIG. 2, and a receiving end may demodulate the multi-UE data in the same manner as described in FIG. 2.

Since the NoMA-based system superposes and transmits signals for multiple UEs on the same time-frequency resource, it has a high decoding error rate compared to the LTE system but may support high frequency usage efficiency or large connectivity. In other words, the NoMA system may guarantee high frequency usage efficiency or large connectivity with no increase in the decoding error rate by controlling the coding rate according to system environments.

Figure 4:
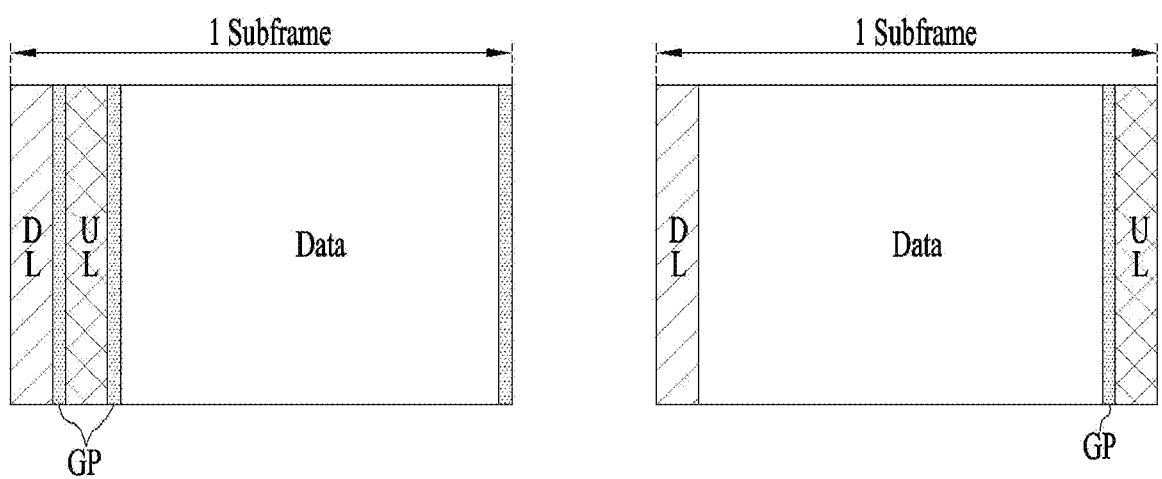
FIG. 4 is a diagram illustrating a self-contained subframe structure.

FIG. 4 is a diagram illustrating a self-contained subframe structure.

Specifically, FIG. 4 shows the self-contained subframe structure for satisfying a low-latency requirement among 5G performance requirements. According to a TDD-based self-contained subframe structure, one subframe includes a downlink resource region (e.g., a downlink control channel), an uplink resource region (e.g., an uplink control channel), and a guard period (GP) for solving an interference issue between downlink and uplink, and a resource region for data transmission.

FIG. 4 (a) shows an example of the self-contained subframe structure. In FIG. 4 (a), a subframe is configured in the following order: downlink resource region—uplink resource region—data resource region. The GP exists between resource regions. The downlink resource region denoted by DL may be a resource region for a downlink control channel, and the uplink resource region denoted by UL may be a resource region for an uplink control channel.

FIG. 4 (b) shows another example of the self-contained subframe structure. In FIG. 4(b), a subframe is configured in the following order: downlink resource region—data resource region—uplink resource region. The GP exists only before the uplink resource region. The downlink resource region denoted by DL may be a resource region for a downlink control channel, and the uplink resource region denoted by UL may be a resource region for an uplink control channel.

In 5G new RAT (NR), asynchronous adaptive HARQ is under discussion. Different HARQ processes are identified using HARQ process IDs of $\{0, 1, 2, 3, \ldots, 7\}$. The HARQ operation is controlled by downlink control information (DCI) from a BS. Thus, downlink/uplink (DL/UL) HARQ supports asynchronous adaptive retransmission. The details of the operation are defined as shown in Table 1 depending on DL/UL grant information on a PDCCH.

TABLE 1

| DCI information on PDCCH | Operation |
| --- | --- |
| NDI (1 bit) | [0] packet retransmission, [1] new packet transmission |
| HARQ process ID (3 bit) | [0~7] process ID of corresponding packet |
| redundancy version (2 bit) | [0~3] redundancy version of corresponding packet |

Table 1 shows the operations of a receiver depending on HARQ mode in NR.

The redundancy version is not used in chase combining. During a DL HARQ process, a UE's data channel decoder operates as follows. As described above, the data channel decoder uses grant information received in the same subframe.

In the case NDI=1, it is determined as new transmission.
  The data channel decoder decodes received soft data and then stores the soft data in a circular buffer.
In the case of NDI=0, it is determined as retransmission.
  The data channel decoder performs decoding by combining the received soft data with previous soft data stored in the decoder circular buffer and then stores the combined soft data in the circular buffer.

The data channel decoder configures ACK/NACK information depending decoding results and transmit the ACK/NACK information to higher layers.

In the case of UL HARQ, for a packet with the same HARQ process ID, a BS's data channel decoder uses ACK/NACK information obtained from a previous data decoding result.

If the previous result is an ACK, the data channel decoder decodes received soft data and then stores the soft data in a circular buffer.

If the previous result is a NACK, the data channel decoder performs decoding by combining the received soft data with circular buffer data and then stores the combined soft data in the circular buffer.

The data channel decoder configures ACK/NACK information depending on decoding results and transmit the ACK/NACK information to higher layers.

In the NR, the following four parameters may be defined for asynchronous adaptive HARQ.

$k_{DL}$: a subframe offset (gap) between DL data and corresponding DL HARQ feedback (i.e., DL HARQ feedback for the DL data)

$k_{UL}$: a subframe offset (gap) between UL data and corresponding UL HARQ feedback (i.e., UL HARQ feedback for the DL data)

$g_{DL}$: a subframe offset between DL HARQ feedback for DL data and retransmission of the DL data (i.e., subframe offset between DL HARQ feedback and corresponding retransmission)

$g_{UL}$: a subframe offset between UL HARQ feedback for UL data and retransmission of the UL data (i.e., subframe offset between UL HARQ feedback and corresponding retransmission)

The values of the four parameters ($k_{DL}$, $k_{UL}$, $g_{DL}$, and $g_{UL}$) may be dynamically changed by encoding latency and scheduling. For example, when $k_{DL}=3$ and $g_{DL}=2$, it may be illustrated as shown in FIG. 5.

FIG. 5 is a diagram illustrating HARQ feedback and retransmission timings when $k_{DL}=3$ and $g_{DL}=2$.

Referring to FIG. 5, when a UE receives DCI and DL data in subframe #0 (i.e., a subframe with index 0), the UE transmits DL HARQ feedback (NACK in FIG. 5) for the DL data in subframe #3 since $k_{DL}$ is 3. Since $g_{DL}$ is set to 2, a BS retransmits the DL data in subframe #5.

FIG. 6 is a diagram illustrating HARQ feedback and retransmission timings when $k_{UL}=3$ and $g_{UL}=1$.

Referring to FIG. 6, when a UE receives DCI in subframe #0 (i.e., a subframe with index 0) and transmits UL data in subframe #1 based on the received DCI, a BS transmits UL HARQ feedback (NACK in FIG. 6) for the UL data in subframe #4 since $k_{UL}$ is 3. In addition, since $g_{UL}$ is set to 1, the UE retransmit the UL data in subframe #5.

In FIG. 5, since $g_{DL}$ is applied by the BS and the UE continuously monitors DL retransmission by decoding the DCI, the UE may require no indication. In addition, since $k_{UL}$ is applied by the BS and the UE continuously monitors UL ACK/NACK by decoding the DCI, the UE may require no indication. On the other hand, in FIG. 6, since gut is applied by the UE on receipt of scheduling, a UL retransmission timing should be indicated to the UE through the DCI. In addition, since $k_{DL}$ is applied by the UE on receipt of scheduling, a DL ACK/NACK timing should be indicated to the UE through the DCI. For such an indication, a field needs to be included in the DCI. For example, a 2-bit field may be defined in DCI of the LTE/LTE-A system as shown in Table 2. In this case, it is assumed that UL data scheduling or DL ACK/NACK transmission can be performed in a subframe in which the DCI is received.

TABLE 2

| Field of $k_{DL}$ in DCI format 1 or 2 | 00 | 01 | 10 | 11 |
|---|---|---|---|---|
| Subframe Offset $k_{DL}$ | 0 | 1 | 2 | 3 |

Figure 7:
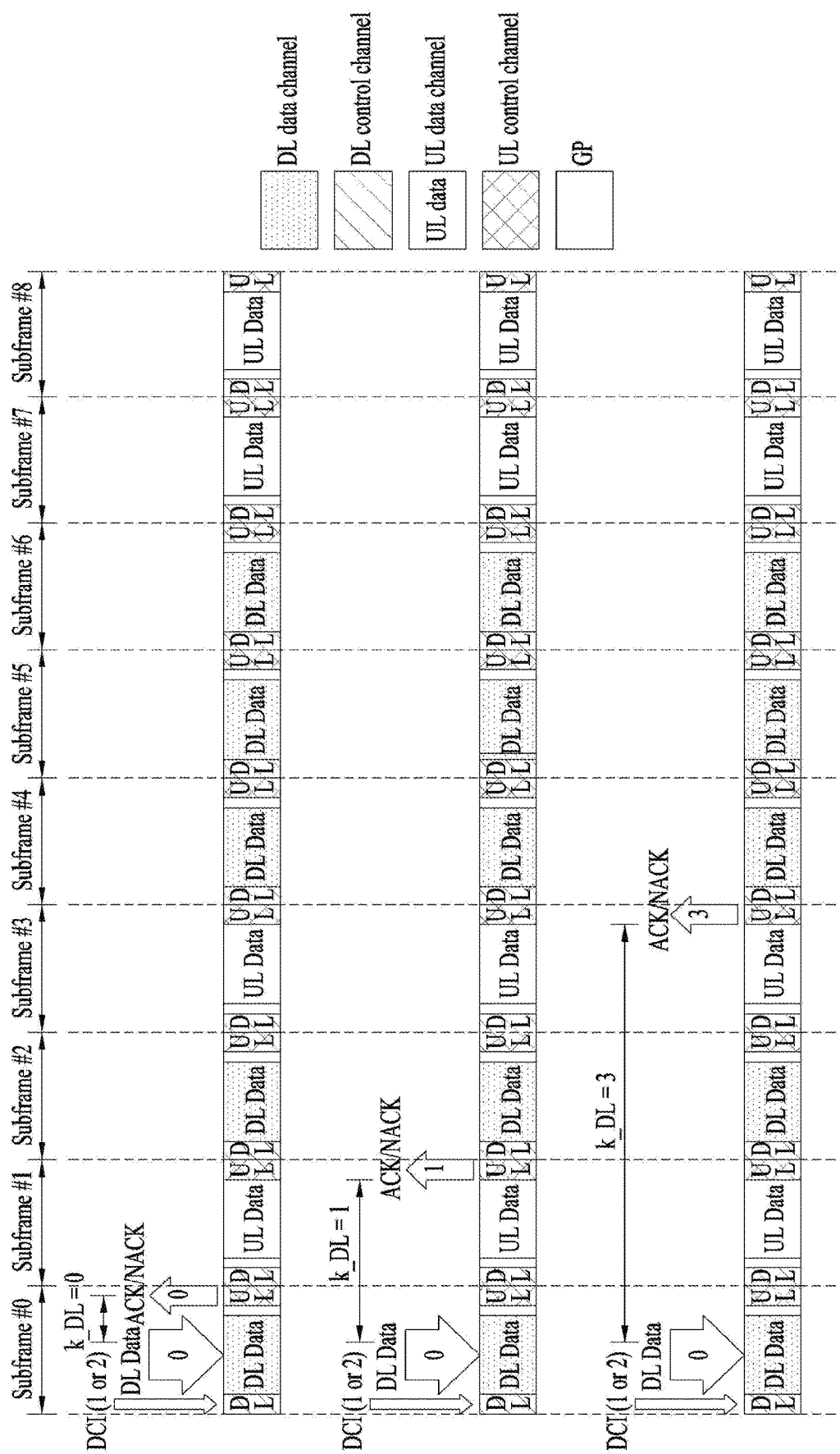
FIG. 7 is a diagram illustrating a relationship between a subframe in which DCI is received and a subframe in which DL ACK/NACK is transmitted.

The contents of Table 2 may be illustrated as shown in FIG. 7.

FIG. 7 is a diagram illustrating a relationship between a subframe in which DCI is received and a subframe in which DL ACK/NACK is transmitted.

As shown in Table 2, $k_{DL}$ has a value of 0, 1, 2, or 3. FIG. 7 shows that $k_{DL}$ has the values of 0, 1, and 3 among the values in Table 2.

Table 3 shows the values of $g_{UL}$ when a 2-bit field is defined in DCI of the LTE/LTE-A system.

TABLE 3

| Field of $g_{UL}$ in DCI format 0 or 4 | 00 | 01 | 10 | 11 |
|---|---|---|---|---|
| Subframe Offset $g_{UL}$ | 0 | 1 | 2 | 3 |

Figure 8:
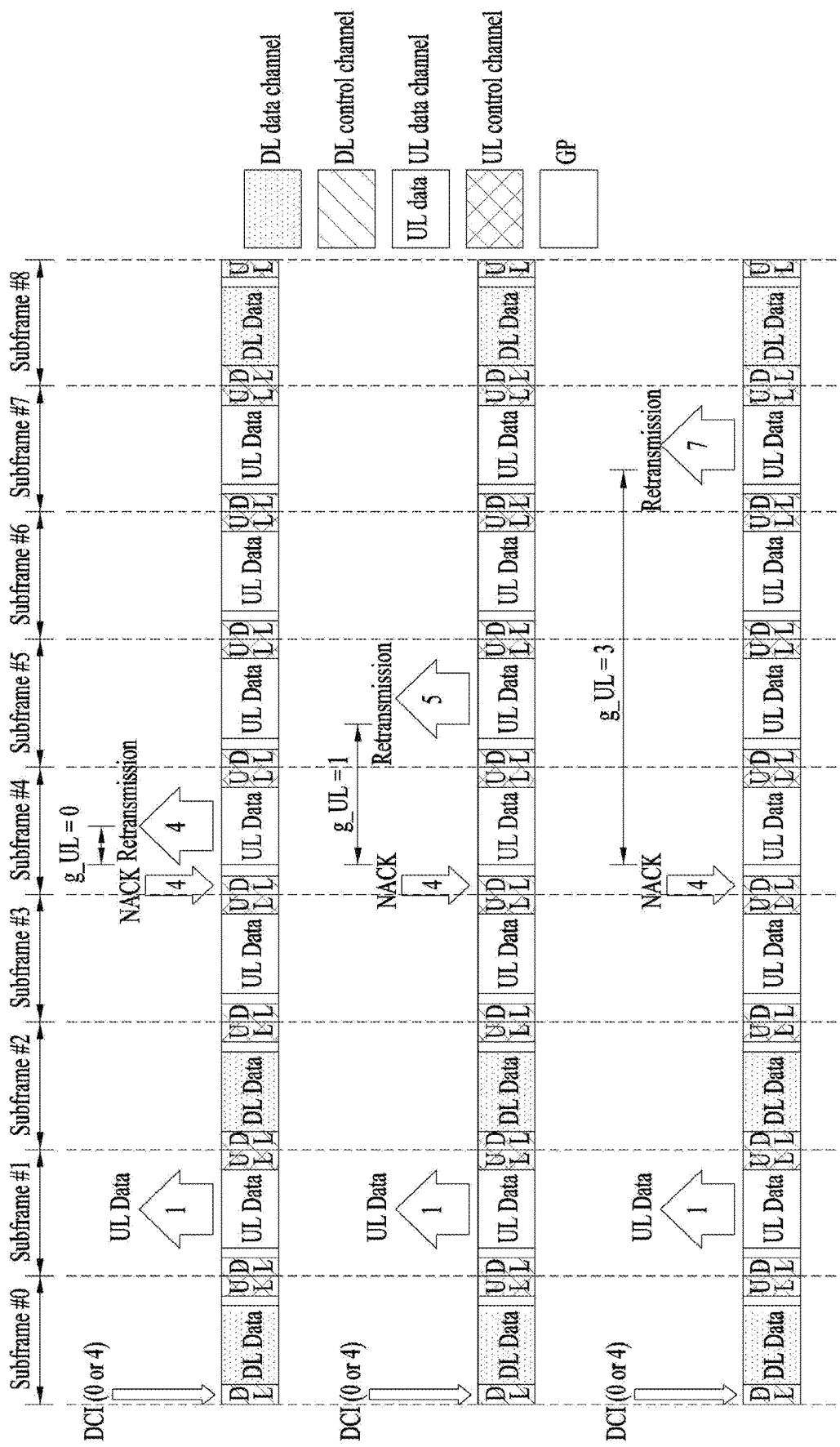
FIG. 8 is a diagram illustrating a relationship between a subframe in which NACK is received and a subframe in which retransmission is performed.

FIG. 8 is a diagram illustrating a relationship between a subframe in which NACK is received and a subframe in which retransmission is performed.

As shown in Table 3, $g_{UL}$ has a value of 0, 1, 2, or 3. FIG. 8 shows that $g_{UL}$ has the values of 0, 1, and 3 among the values in Table 3.

To reduce the complexity of DCI blind detection and monitoring performed by a UE, the fields for $g_{DL}$ and $k_{UL}$ may be included in DCI. By doing so, DCI overhead may increase, but UE DCI monitoring complexity may be reduced.

In NoMA-based systems, since multi-user data is allocated to the same resource, transmission is performed with different codewords or different power on the same physical resource. That is, considering that a data resource region is shared, a method of using a PUCCH format for a HARQ process needs to be defined. In addition, in the NoMA-based systems, a BS may need to transmit multiple access (MA) signature information in DCI. Thus, compared to the legacy LTE, a field for the MA signature information is included in the DCI, and a field for supporting asynchronous adaptive HARQ may also be included therein. In this case, DCI overhead may significantly increase if a large amount of control information is continuously transmitted. To solve this problem, the present disclosure proposes a control signaling method.

An MA signature is defined as follows.

An MA resource is composed of an MA physical resource and an MA signature. The MA signature includes at least one of a codebook/codeword, sequence, interleaver and/or mapping pattern, demodulation reference signal, preamble, spatial dimension, and power dimension.

In an embodiment of the present disclosure, provided is a control signal method for connecting a NoMA codeword index to HARQ information when NoMA-based transmission is performed for data transmission and reception. Although the present disclosure focuses on a relationship between an ACK/NACK signal and a NoMA codeword index for DL, it is apparent that the disclosure is applicable to UL. In addition, a codeword is taken as an example of the MA signature, but the present disclosure is also applicable when other types of MA signatures are used.

In the present disclosure, a NoMA codeword means a complex element vector selected by (or allocated to) each UE to perform the NoMA. A codebook means a set of codewords used by each UE to perform the NoMA, and there may be a plurality of codebooks. A UE-specific NCC means that the complex element vector of the codebook selected by (or allocated to) each UE is used for a symbol to be transmitted. Therefore, the NCC (or UE-specific NCC) may be expressed by a codebook index and a codeword index. A non-orthogonal codebook may be expressed as shown in Equation 1.

$$C = [\, c^{(1)} \; \cdots \; c^{(K)} \,] = \begin{bmatrix} c_1^{(1)} & \cdots & c_1^{(K)} \\ \vdots & \ddots & \vdots \\ c_N^{(1)} & \cdots & c_N^{(K)} \end{bmatrix} \quad \text{[Equation 1]}$$

In Equation 1, $c^{(j)}$ indicates a codeword for a j-th UE, and a codebook C indicates a codeword set for a total of K UEs. Using $c^{(j)}$ to transmit data for the j-th UE is defined as the NCC. In addition, the codebook may be expressed by the vector length of a codeword, N and the number of codewords, K, where N and K mean a spreading factor and a superposition factor, respectively. For convenience of description, although it is assumed that one codeword is used for one UE, a plurality of codewords may be used by one UE or one codeword may be used by a plurality of UEs. Moreover, codeword hopping may be performed such that one or more codewords allocated to one UE are used as different codewords in the same codebook or different codewords in a different codebook depending on time or frequency of use.

Case in which Superposition of ACK/NACK Signals for Multiple Users is not Allowed (e.g., PUCCH Format 2)

As a case where ACK/NACK signals for multiple users are not superposed in one UL control channel zone (e.g., xPUCCH zone), ACK/NACK transmission using PUCCH format 2 in the LTE system may be considered. In this case, if a physical resource for DL data is shared according to a NoMA-based scheme, a data zone is used by multiple users but an ACK/NACK signal related to only single user may be transmitted.

TDM-Based ACK/NACK Signal Tied to NoMA Codeword Index

A codeword index field in DCI is tied to a subframe offset, $k_{DL}$ for supporting asynchronous adaptive HARQ. That is, $k_{DL}$ may be replaced with the NoMA codeword index field. Alternatively, the codeword index field may be replaced with the $k_{DL}$ field. For example, a 2-bit field may be defined in DCI of the LTE system as follows. In this case, it is assumed that DL ACK/NACK transmission can be performed in a subframe in which the DCI is received.

TABLE 4

| Field of NoMA-Codeword Index or Field of $k_{DL}$ in DCI format 1 or 2 | 00 | 01 | 10 | 11 |
|---|---|---|---|---|
| NoMA-Codeword Index | 0 | 1 | 2 | 3 |
| Subframe Offset $k_{DL}$ | 0 | 1 | 2 | 3 |

Referring to Table 4, it can be seen that the codeword index field in the DCI indicates a NoMA codeword index and at the same time, indicates a subframe offset $k_{DL}$ tied to the NoMA codeword index.

Figure 9:
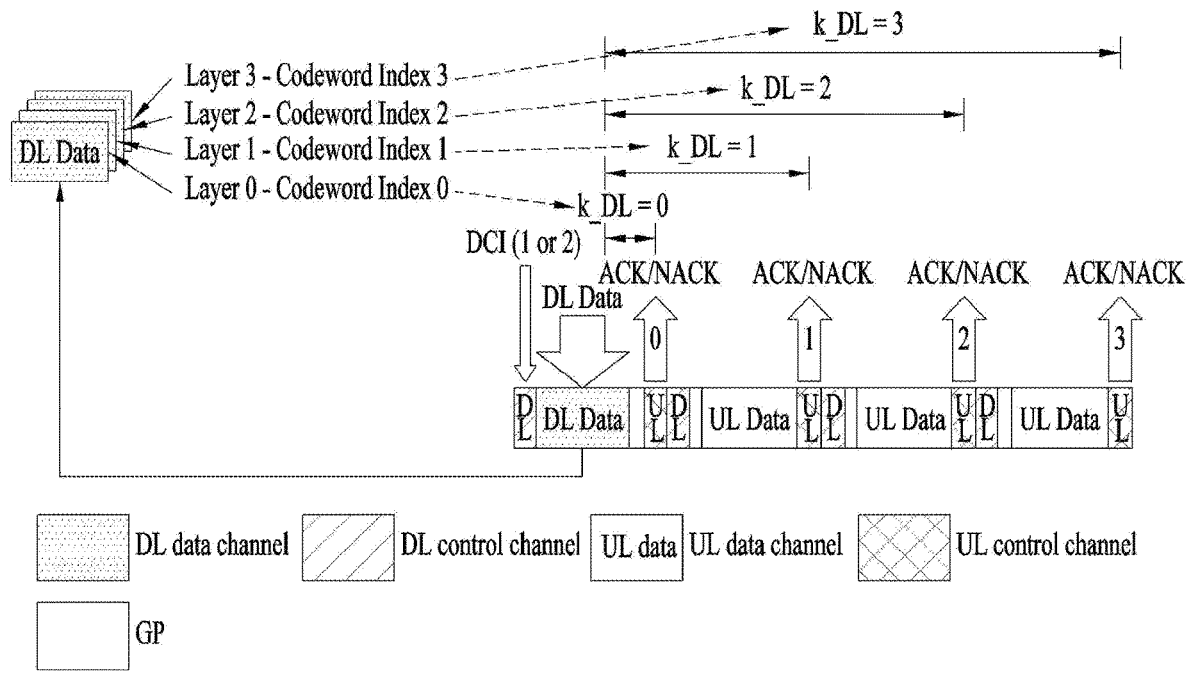
FIG. 9 is a diagram illustrating asynchronous adaptive HARQ operation of a UE and a BS based on the NoMA codeword index in Table 4.

The contents of Table 4 may be illustrated as shown in FIG. 9. FIG. 9 is a diagram illustrating asynchronous adaptive HARQ operation of a UE and a BS based on the NoMA codeword index in Table 4.

The UE and BS may know in advance that the NoMA codeword index is tied to the subframe offset $k_{DL}$. If the NoMA codeword index field in the DCI transmitted from the BS indicates NoMA codeword index 0, the UE may know that a NoMA codeword index to be used for decoding is NoMA codeword index 0 and the subframe offset ($k_{DL}$) is 0 since NoMA codeword index 0 is tied to subframe offset ($k_{DL}$) 0 as shown in Table 4. Upon receiving the DCI and DL data according to the DCI in a subframe, the UE transmits an ACK/NACK signal for the received DL data to the BS in the corresponding subframe (in particular, on a UL control channel in the corresponding subframe) since the subframe offset ($k_{DL}$) is 0.

If the NoMA codeword index field in the DCI transmitted from the BS indicates NoMA codeword index 1, the UE may know that the NoMA codeword index to be used is NoMA codeword index 1 and the subframe offset ($k_{DL}$) is 1. In this case, the UE may transmit the ACK/NACK signal for the DL data in a subframe next to the subframe where the DL data is received.

Similarly, when the NoMA codeword index field indicates NoMA codeword index 2 or 3, the UE may transmit the ACK/NACK signal in a specific subframe based on the value of the tied subframe offset ($k_{DL}$).

When one 2-bit field is defined in DCI as described above, the asynchronous adaptive HARQ operation may be performed over up to 4 subframes by signaling a maximum of 4 NoMA codewords.

FDM-Based ACK/NACK Signal Tied to NoMA Codeword Index

A codeword index field in DCI is tied to a frequency offset ($f_{ACK/NACK}$) for supporting the asynchronous adaptive HARQ. That is, the NoMA codeword index field indicates information on a NoMA codeword index and a frequency band (one of the predefined sub-bands) for transmitting an ACK/NACK signal. For example, a 2-bit field may be defined in DCI of the LTE system as follows. In this case, it is assumed that DL ACK/NACK transmission can be performed in a subframe in which the DCI is received and $k_{DL}$ is signaled as 0.

TABLE 5

| Field of NoMA-Codeword Index in DCI format 1 or 2 | 00 | 01 | 10 | 11 |
|---|---|---|---|---|
| NoMA-Codeword Index | 0 | 1 | 2 | 3 |
| Frequency Offset $f_{ACK/NACK}$ for xPUCCH Zone | 0 | 1 | 2 | 3 |

Referring to FIG. 5, it can be seen that the codeword index field in the DCI indicates a NoMA codeword index and at the same time, indicates a frequency offset ($f_{ACK/NACK}$) tied to the NoMA codeword index.

Figure 10:
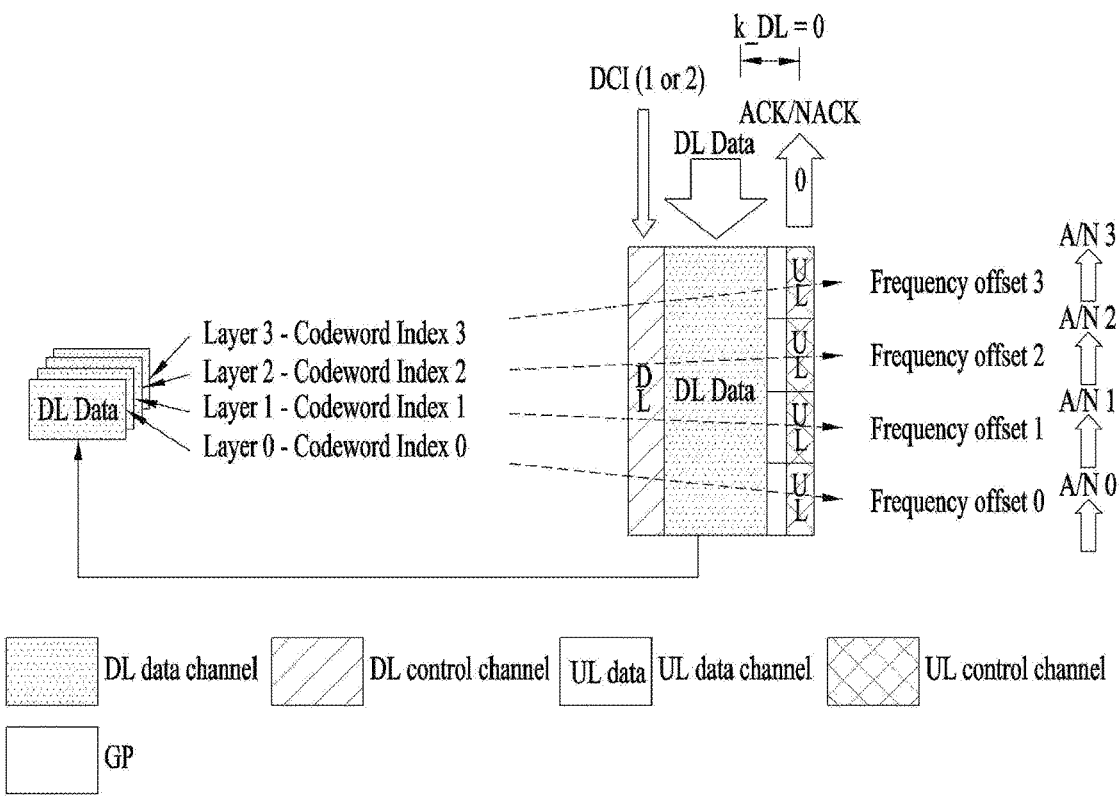
FIG. 10 is a diagram illustrating asynchronous adaptive HARQ operation of a UE and a BS based on the NoMA codeword index in Table 5.

The contents of Table 5 may be illustrated as shown in FIG. 10. FIG. 10 is a diagram illustrating asynchronous adaptive HARQ operation of a UE and a BS based on the NoMA codeword index in Table 5.

The UE and BS may know in advance that the NoMA codeword index is tied to the frequency offset $f_{ACK/NACK}$. If the NoMA codeword index field in the DCI transmitted from the BS indicates NoMA codeword index 0, the UE may know that a NoMA codeword index to be used for decoding is NoMA codeword index 0 since NoMA codeword index 0 is tied to a subframe index and frequency offset ($f_{ACK/NACK}$) 0 as shown in Table 5. In this case, regarding the frequency-domain location for HARQ ACK/NACK transmission, since the indicated frequency offset ($f_{ACK/NACK}$) is 0, the UE may know that the UE should transmit ACK/NACK at a location corresponding to, for example, the lowest frequency band among frequency bands in a UL control channel zone (e.g., xPUCCH zone) of a corresponding subframe. Since it is assumed that $k_{DL}$ is signaled as 0, the UE may transmit the HARQ ACK/NACK in a subframe where DL data is received according to the DCI, and more particularly, transmit the ACK/NACK at the location corresponding to, for example, the lowest frequency band among the frequency bands in the UL control channel zone (e.g., xPUCCH zone).

When the NoMA codeword field in the DCI indicates a value different from NoMA codeword index 0, the UE may transmit the ACK/NACK in a corresponding frequency band in the xPUCCH zone according to the value of a frequency offset tied to the indicated NoMA codeword index.

When one 2-bit field is defined in DCI as described above, the asynchronous adaptive HARQ operation may be performed by signaling a maximum of 4 NoMA codewords and designating a maximum of 4 frequency offsets for ACK/NACK transmission.

As a similar method, if an ACK/NACK signal is capable of being designated by space division multiplexing (SDM), an SDM layer may be tied to a NoMA codeword index in the same manner as described above. That is, when an ACK/NACK layer is designated by a NoMA codeword index in DCI, a UE may transmit an ACK/NACK signal to a BS through the ACK/NACK layer indicated by the NoMA codeword index.

Case in which Superposition of ACK/NACK Signals for Multiple Users is Allowed (e.g., PUCCH Format 1 or 3)

As a case where ACK/NACK signals for multiple users are superposed in one UL control channel zone (e.g., xPUCCH zone), ACK/NACK transmission using PUCCH format 1 or 3 in the LTE may be considered. In this case, if a physical resource for DL data is shared according to a NoMA-based scheme, a data zone is used by multiple users and ACK/NACK signals related to the multiple users are may also be transmitted.

When an xPUCCH zone is shared based on orthogonal sequences, an ACK/NACK signal may be transmitted based on an orthogonal sequence tied to a NoMA codeword index. For example, a codeword index field in DCI is tied to an orthogonal sequence in the xPUCCH zone for supporting the asynchronous adaptive HARQ. That is, the NoMA codeword index field indicates information on the NoMA codeword index and the orthogonal sequence (one of the predefined orthogonal sequences) for transmitting the ACK/NACK signal. For example, a 2-bit field may be defined in DCI of the LTE system as shown in Table 6. In this case, it is assumed that DL ACK/NACK transmission can be performed in a subframe in which the DCI is received and the value of $k_{DL}$ is signaled as 0 (through the DCI).

TABLE 6

| Field of NoMA-Codeword Index in DCI format 1 or 2 | 00 | 01 | 10 | 11 |
|---|---|---|---|---|
| NoMA-Codeword Index | 0 | 1 | 2 | 3 |
| Orthogonal Sequence Index for xPUCCH Zone | 0 | 1 | 2 | 3 |

Referring to Table 6, it can be seen that the codeword index field in the DCI indicates a NoMA codeword index and at the same time, indicates an orthogonal sequence index for ACK/NACK transmission, which is tied to the NoMA codeword index.

Figure 11:
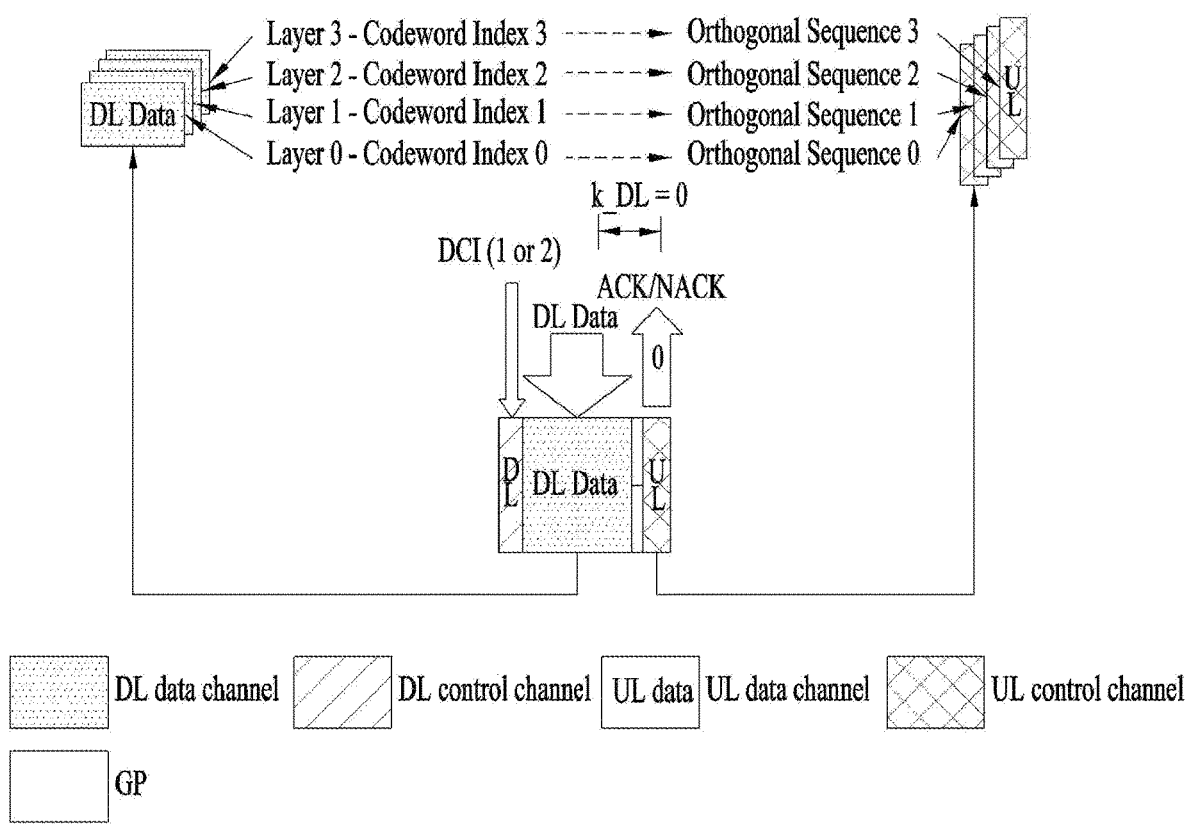
FIG. 11 is a diagram illustrating asynchronous adaptive HARQ operation of a UE and a BS based on the NoMA codeword index in Table 6.

The contents of Table 6 may be illustrated as shown in FIG. 11. FIG. 11 is a diagram illustrating asynchronous adaptive HARQ operation of a UE and a BS based on the NoMA codeword index in Table 6.

The UE and BS may know in advance that the NoMA codeword index is tied to the orthogonal sequence index. Since a subframe index and orthogonal sequence index 0 are tied to NoMA codeword index 0 as shown in Table 6, the NoMA codeword index field in the DCI transmitted from the BS indicates NoMA codeword index 0, and the UE may know that a NoMA codeword index to be used for decoding is NoMA codeword index 0. In this case, the UE may know that the UE should transmit HARQ ACK/NACK by applying orthogonal sequence index 0 in the xPUCCH zone.

When the NoMA codeword field in the DCI indicates a value different from NoMA codeword index 0, the UE may transmit the ACK/NACK on the xPUCCH by applying the value of an orthogonal sequence index tied to the indicated NoMA codeword index.

When one 2-bit field is defined in DCI as described above, the asynchronous adaptive HARQ operation may be performed by signaling a maximum of 4 NoMA codewords and designating a maximum of 4 orthogonal sequences for ACK/NACK transmission.

When a UL control channel zone (e.g., xPUCCH zone) is shared based on non-orthogonal sequences, an ACK/NACK signal may be transmitted based on a non-orthogonal sequence tied to a NoMA codeword index. A NoMA codeword index field in DCI is tied to a non-orthogonal sequence in the xPUCCH zone for supporting the asynchronous adaptive HARQ. That is, the NoMA codeword index field indicates information on the NoMA codeword index and the non-orthogonal sequence (one of the predefined non-orthogonal sequences) for transmitting the ACK/NACK signal. For example, a 2-bit field may be defined in DCI of the LTE system as follows. In this case, it is assumed that DL ACK/NACK transmission can be performed in a subframe in which the DCI is received and the value of $k_{DL}$ is signaled as 0.

TABLE 7

| Field of NoMA-Codeword Index in DCI format 1 or 2 | 00 | 01 | 10 | 11 |
|---|---|---|---|---|
| NoMA-Codeword Index | 0 | 1 | 2 | 3 |
| Non-orthogonal Sequence Index for xPUCCH Zone | 0 | 1 | 2 | 3 |

Referring to Table 7, it can be seen that the codeword index field in the DCI indicates a NoMA codeword index and at the same time, indicates a non-orthogonal sequence index for ACK/NACK transmission, which is tied to the NoMA codeword index.

A UE and a BS may know in advance that the NoMA codeword index is tied to the non-orthogonal sequence index. If the NoMA codeword index field in the DCI transmitted from the BS indicates NoMA codeword index 0, the UE may know that a NoMA codeword index to be used for decoding is NoMA codeword index 0 since NoMA codeword index 0 is tied to a subframe index and non-orthogonal sequence index 0 as shown in Table 7. In this case, the UE may know that the UE should transmit HARQ ACK/NACK by applying a non-orthogonal sequence corresponding to non-orthogonal sequence index 0 in the xPUCCH zone.

When the NoMA codeword field in the DCI indicates a value different from NoMA codeword index 0, the UE may transmit the ACK/NACK on the xPUCCH by applying a non-orthogonal sequence corresponding to a non-orthogonal sequence index tied to the indicated NoMA codeword index.

When one 2-bit field is defined in DCI as described above, the asynchronous adaptive HARQ operation may be performed by signaling a maximum of 4 NoMA codewords and designating a maximum of 4 non-orthogonal sequences for ACK/NACK transmission.

The proposed methods may operate by combination with a control channel element (CCE) number of the DCI carrying the NoMA codeword index field. For example, in the case of a self-contained subframe structure considered in 5G NR, an xPUCCH zone may be composed of one or two symbols unlike the legacy LTE. In this case, one xPUCCH zone may be composed of a number of subcarriers to improve the reliability of an ACK/NACK signal.

If an xPUCCH zone is greater in frequency-domain size than a NoMA data zone and the xPUCCH zone is shared based on orthogonal or non-orthogonal sequence, an ACK/NACK signal may be transmitted based on an orthogonal or non-orthogonal sequence tied to a NoMA code index. The number of a CCE on which DCI is transmitted and a NoMA codeword index field in the DCI are tied to an orthogonal or non-orthogonal sequence in the xPUCCH zone for supporting the asynchronous adaptive HARQ. That is, the NoMA codeword index field and the number of the CCE on which the NoMA codeword index field is transmitted indicate information on the NoMA code index and the orthogonal or non-orthogonal sequence (one of the predefined orthogonal or non-orthogonal sequences) for transmitting the ACK/NACK signal. For example, a 2-bit field may be defined in DCI of the LTE as follows. In this case, it is assumed that DL ACK/NACK transmission can be performed in a subframe in which the DCI is received and the value of $k_{DL}$ is signaled as 0.

Figure 12:
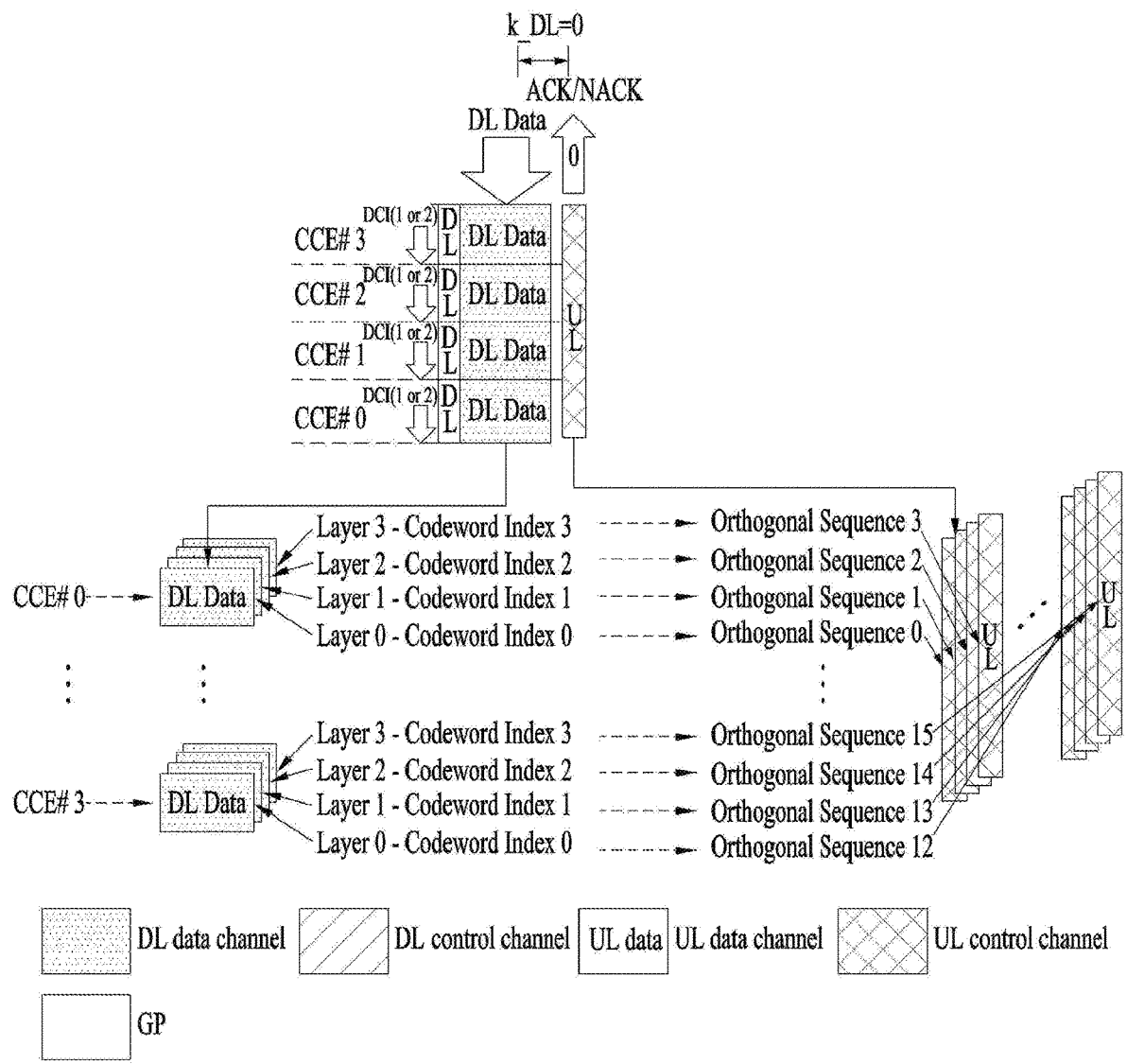
FIG. 12 is a diagram illustrating asynchronous adaptive HARQ operation of a UE and a BS based on the NoMA codeword index in Table 8.

The contents of Table 8 may be illustrated as shown in FIG. 12. FIG. 12 is a diagram illustrating asynchronous adaptive HARQ operation of a UE and a BS based on the NoMA codeword index in Table 8.

When one 2-bit field is defined in DCI as shown in Table 8, the asynchronous adaptive HARQ operation may be performed by signaling a maximum of 4 NoMA codeword indices and designating a maximum of 16 orthogonal or non-orthogonal sequences for ACK/NACK transmission through combination with the number of a CCE on which a NoMA codeword index is signaled. That is, the NoMA codeword index field may be combined with the number of the CCE on which the NoMA codeword index field is transmitted, thereby designating more orthogonal/non-orthogonal sequences for the ACK/NACK transmission or more ACK/NACK signal transmission (time/frequency) locations.

Although it is assumed that one CCE is a single unit, multiple CCEs may be used for a single piece of data depending on the amount of information in a DL control channel. In this case, similar to Table 8, a lookup table may be predefined with respect to the lowest CCE number (or index) or the highest CCE number (or index).

The above lookup tables are merely an example for clarity, that is, the tables may be modified into other forms in terms of system parameters and optimization.

Hereinabove, the DL ACK/NACK transmission of a user device or UE has been described. For $g_{UL}$ that indicates UL transmission or retransmission, a NoMA codeword index may be mapped in the same manner.

In addition, a resource for ACK/NACK signaling may be mapped by combining two or more of the above-described TDM/FDM/CDM methods. For example, when a 2-bit field is defined in DCI of the LTE, mapping of an ACK/NACK signal may be defined for the TDM/FDM combination as shown in Table 9. In this case, it is assumed that ACK/NACK for DL transmission can be transmitted in a subframe in which the DCI is received.

TABLE 8

| CCE Index of DCI | Field of NoMA-Codeword Index in DCI format 1 or 2 | NoMA-Codeword Index | Orthogonal Sequence Index for xPUCCH Zone |
|---|---|---|---|
| 0 | 00 | 0 | 0 |
|   | 01 | 1 | 1 |
|   | 10 | 2 | 2 |
|   | 11 | 3 | 3 |
| 1 | 00 | 0 | 4 |
|   | 01 | 1 | 5 |
|   | 10 | 2 | 6 |
|   | 11 | 3 | 7 |
| 2 | 00 | 0 | 8 |
|   | 01 | 1 | 9 |
|   | 10 | 2 | 10 |
|   | 11 | 3 | 11 |
| 3 | 00 | 0 | 12 |
|   | 01 | 1 | 13 |
|   | 10 | 2 | 14 |
|   | 11 | 3 | 15 |

Referring to Table 8, it can be seen that the codeword index field in the DCI indicates a NoMA codeword index and at the same time, indicates an orthogonal sequence index for ACK/NACK transmission, which is tied to the NoMA codeword index. In this case, the number of a CCE on which the NoMA codeword index field is transmitted may designate a maximum of 16 orthogonal/non-orthogonal sequences for ACK/NACK signal transmission.

TABLE 9

| Field of NoMA-Codeword Index in DCI format 1 or 2 | 00 | 01 | 10 | 11 |
|---|---|---|---|---|
| NoMA-Codeword Index | 0 | 1 | 2 | 3 |
| Subframe Offset $k_{DL}$ | 0 | 1 | 0 | 1 |
| Frequency Offset $f_{ACK/NACK}$ for xPUCCH Zone | 0 | 0 | 1 | 1 |

Referring to Table 9, it can be seen that the codeword index field in the DCI indicates a NoMA codeword index and at the same time, indicates a subframe offset, $k_{DL}$ and a frequency offset ($f_{ACK/NACK}$) for transmitting ACK/NACK for DL transmission, which are tied to the NoMA codeword index.

Figure 13:
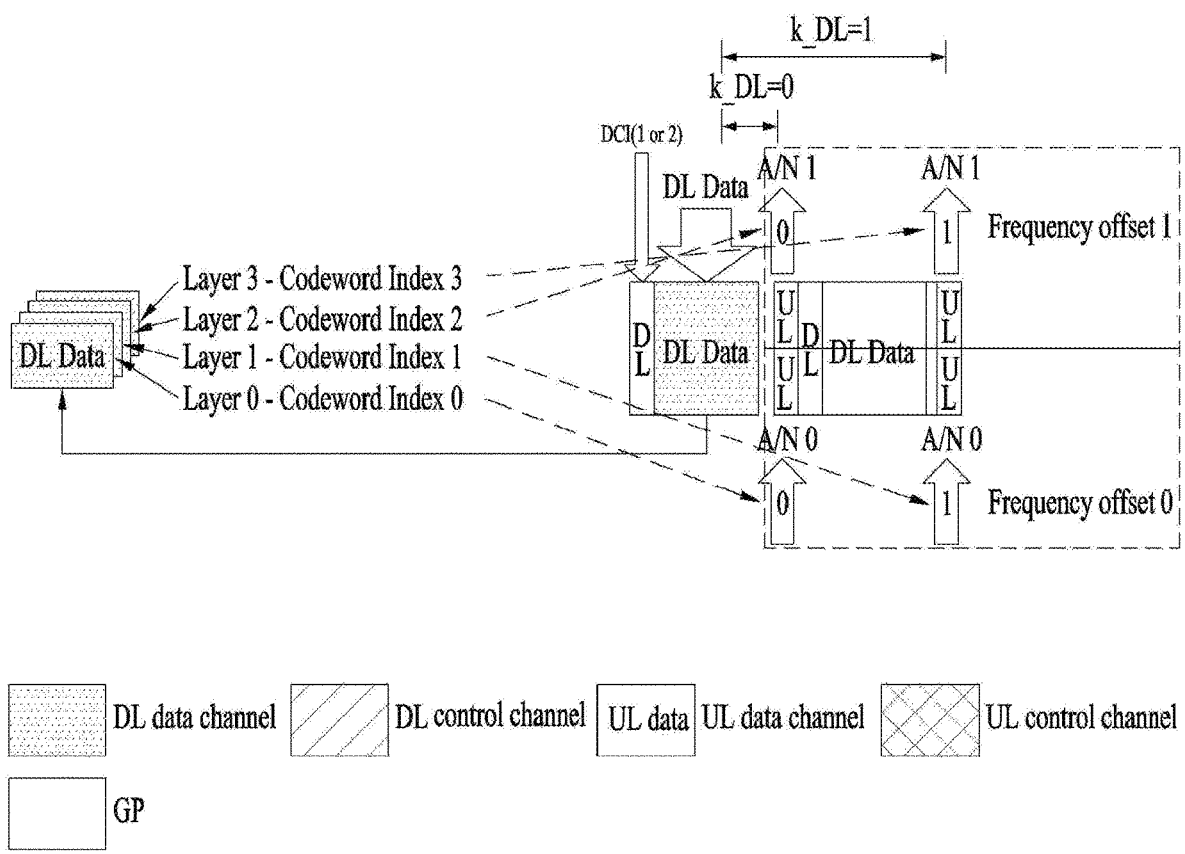
FIG. 13 is a diagram illustrating asynchronous adaptive HARQ operation of a UE and a BS based on the NoMA codeword index in Table 9.

The contents of Table 9 may be illustrated as shown in FIG. 13. FIG. 13 is a diagram illustrating asynchronous adaptive HARQ operation of a UE and a BS based on the NoMA codeword index in Table 9.

The UE and BS may know in advance that the NoMA codeword index is tied to both the subframe offset $k_{DL}$ and the frequency offset $f_{ACK/NACK}$ for transmitting ACK/NACK for DL transmission. If the NoMA codeword index field in the DCI transmitted from the BS indicates NoMA codeword index 0, the UE may know that a NoMA codeword index to be used for decoding is NoMA codeword index 0, the subframe offset ($k_{DL}$) is 0, and the frequency offset for the ACK/NACK transmission is also 0 since NoMA codeword index 0 is tied to subframe offset ($k_{DL}$) 0 and the frequency offset ($f_{ACK/NACK}$) for the ACK/NACK transmission as shown in Table 9. In this case, after receiving the DCI and DL data according to the DCI in a subframe, the UE may transmit an ACK/NACK signal for the received DL data in an xPUCCH zone of the corresponding subframe and in a frequency band corresponding to the frequency offset value to the BS since the subframe offset ($k_{DL}$) is 0.

In addition, when the NoMA codeword index field in the DCI transmitted from the BS indicates a NoMA codeword index different from NoMA codeword index 0, the UE may obtain a NoMA codeword index to be used for decoding, a corresponding subframe offset ($k_{DL}$) value, and a corresponding frequency offset value from Table 9.

When one 2-bit field is defined in DCI as described above, the asynchronous adaptive HARQ operation may be performed by signaling a maximum of 4 NoMA codeword indices and designating up to 2 subframe offsets and 2 frequency offsets for ACK/NACK transmission.

Although the present disclosure is described mainly based on the NoMA codeword, which is one of the MA signatures, various identifiers capable of identifying multiuser data when it is superposed for transmission such as a power level, an interleaver index, a NoMA codebook index, etc. may be used depending on NoMA technologies. For example, when the interleaver index or NoMA codebook index is included in DCI according to the NoMA technology, the above-described NoMA codeword based operations may be equally applied. That is, the operations may be equally applied to all MA signatures (for example, a codebook/codeword, sequence, interleaver and/or mapping pattern, demodulation reference signal, preamble, spatial dimension, power dimension, etc.).

For example, in the case of MUST corresponding to the power dimension, power levels are controlled to perform multiuser superposition transmission for a user at the cell boundary and a user at the cell center. In this case, a receiving end needs to recognize a transmission power level to perform equalization for decoding. Assuming that power is quantized into 4 levels, mapping of an ACK/NACK signal may be performed in the same manner as the above examples where 4 codeword indices are used.

The above-described methods are applicable to orthogonal multiple access (OMA) as well as the NoMA. For example, if a used codeword is an orthogonal sequence (for example, a column vector of a Hadamard matrix or an Identify matrix) although the multiuser superposition access is still applied, it may be considered as the OMA. In this case, the principles and embodiments of the present disclosure may be equally applied.

Although the present disclosure is described based on DL transmission in a cellular system, the disclosure is also applicable to all systems using multiuser access technology, for example, UL transmission in the cellular system, machine type communication (MTC), device-to-device (D2D) communication, vehicle-to-everything (V2X) communication, etc.

The above-described embodiments of the present disclosure correspond to combinations of the elements and features of the present disclosure. The elements or features may be considered to be selective unless otherwise mentioned. Each element or feature may be practiced without being combined with other elements or features. In addition, an embodiment of the present disclosure may be constructed by combining some of the elements and/or features. The sequences of operation in the embodiments of the present disclosure may be changed. The configurations or features of an embodiment may be included in another embodiment or replaced with the corresponding configurations or features of another embodiment. It is obvious to those skilled in the art that claims that are not explicitly cited in each other in the appended claims may be presented in combination as an embodiment of the present disclosure or included as a new claim by a subsequent amendment after the application is filed.

It will be appreciated by those skilled in the art that the present disclosure can be carried out in other specific ways than those set forth herein without departing from the essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The method of performing a HARQ operation in a NoMA based system and apparatus therefor are industrially applicable to various wireless communication systems including the 3GPP LTE/LTE-A system, the 5G system, etc.

The invention claimed is:

1. A method of performing a hybrid automatic repeat request (HARQ) operation by a user equipment (UE) in a non-orthogonal multiple access (NoMA) based system, the method comprising:
   receiving a downlink control information (DCI) format including a multiple access (MA) signature field for supporting NoMA transmission;
   receiving downlink data based on a value of an MA signature indicated by the MA signature field; and
   transmitting an acknowledgement/negative acknowledgement (ACK/NACK) signal for the downlink data based on a subframe offset value, a frequency offset value, or a sequence index value tied to the value of the indicated MA signature according to a predetermined rule,
   wherein the subframe offset value comprises a subframe offset value between a subframe in which the downlink data is received and a subframe in which the downlink HARQ feedback for the downlink data is transmitted, and
   wherein the frequency offset value indicates a frequency band for transmitting the ACK/NACK signal.

2. The method of claim 1, wherein the MA signature comprises a codeword index, a codebook index, an interleaver index, a demodulation reference signal index, a spatial dimension, or a power dimension.

3. The method of claim 1, wherein the ACK/NACK signal is transmitted further based on a number of a control channel element (CCE) on which the MA signature field is transmitted according to the predetermined rule.

4. The method of claim 1, wherein the ACK/NACK signal is transmitted in the subframe indicated by the subframe offset value tied to the value of the indicated MA signature.

5. The method of claim 1, wherein the ACK/NACK signal is transmitted in the frequency band indicated by the frequency offset value tied to the value of the indicated MA signature.

6. The method of claim 1, wherein the ACK/NACK signal is transmitted by applying a sequence corresponding to the sequence index value tied to the value of the indicated MA signature to the ACK/NACK signal.

7. The method of claim 1, wherein the MA signature field is a 2-bit field.

8. A user equipment (UE) for performing a hybrid automatic repeat request (HARQ) operation in a non-orthogonal multiple access (NoMA) based system, the UE comprising:
a receiver;
a transmitter; and
a processor,
wherein the processor is configured to:
control the receiver to receive a downlink control information (DCI) format including a multiple access (MA) signature field for supporting NoMA transmission and receive downlink data based on a value of an MA signature indicated by the MA signature field; and
perform control to transmit an acknowledgement/negative acknowledgement (ACK/NACK) signal for the downlink data based on a subframe offset value, a frequency offset value, or a sequence index value tied to the value of the indicated MA signature according to a predetermined rule,
wherein the subframe offset value comprises a subframe offset value between a subframe in which the downlink data is received and a subframe in which the downlink HARQ feedback for the downlink data is transmitted, and
wherein the frequency offset value indicates a frequency band for transmitting the ACK/NACK signal.

9. The UE of claim 8, wherein the MA signature comprises a codeword index, a codebook index, an interleaver index, a demodulation reference signal index, a spatial dimension, or a power dimension.

10. The UE of claim 8, wherein the processor is configured to control the transmitter to transmit the ACK/NACK signal further based on a number of a control channel element (CCE) on which the MA signature field is transmitted according to the predetermined rule.

11. The UE of claim 8, wherein the processor is configured to control the transmitter to transmit the ACK/NACK signal in the subframe indicated by the subframe offset value tied to the value of the indicated MA signature.

12. The UE of claim 8, wherein the processor is configured to control the transmitter to transmit the ACK/NACK signal in the frequency band indicated by the frequency offset value tied to the value of the indicated MA signature.

13. The UE of claim 8, wherein the processor is configured to:
apply a sequence corresponding to the sequence index value tied to the value of the indicated MA signature to the ACK/NACK signal; and
control the transmitter to transmit the ACK/NACK signal to which the sequence is applied.

14. The UE of claim 8, wherein the MA signature field is a 2-bit field.

* * * * *